(12) United States Patent
Eichler

(10) Patent No.: US 8,376,146 B2
(45) Date of Patent: Feb. 19, 2013

(54) PRESSURE FILTER WITH VIBRATOR

(75) Inventor: Dietrich Eichler, Konigstein (DE)

(73) Assignee: Röhren-und Pumpenwerk BAUER Gesellschaft m.b.H., Voitsberg (AT)

( * ) Notice: Subject to any disclaimer, the term of this patent is extended or adjusted under 35 U.S.C. 154(b) by 355 days.

(21) Appl. No.: 12/733,369

(22) PCT Filed: Feb. 4, 2008

(86) PCT No.: PCT/DE2008/000199
§ 371 (c)(1),
(2), (4) Date: Apr. 30, 2010

(87) PCT Pub. No.: WO2009/026861
PCT Pub. Date: Mar. 5, 2009

(65) Prior Publication Data
US 2010/0219118 A1    Sep. 2, 2010

(30) Foreign Application Priority Data
Aug. 30, 2007    (DE) .......................... 10 2007 041 119

(51) Int. Cl.
*B01D 33/03*    (2006.01)
(52) U.S. Cl. ......................................... 210/388; 210/396
(58) Field of Classification Search .................. 210/388, 210/391, 396, 780, 791
See application file for complete search history.

(56) References Cited

U.S. PATENT DOCUMENTS
5,108,588 A * 4/1992 Yu .................................. 209/257

FOREIGN PATENT DOCUMENTS
DE    19939338 C2 * 10/2002
WO    WO 02/26348 A * 4/2002

* cited by examiner

*Primary Examiner* — Fred Prince
(74) *Attorney, Agent, or Firm* — Edwards Wildman Palmer LLP; Scott D. Wofsy; Joshua L. Jones

(57) ABSTRACT

The device according to the invention serves for classifying or concentrating liquids laden with fibers or solids by means of screening or filtration. For this purpose, a cylindrical fine screen is arranged in a vertical position in a housing comprising an axially cylindrical vibrator being somewhat smaller than the fine screen so as to produce an annular gap between the screen and the vibrator. In the vibrator, there is a vibration motor with imbalances, which generates circular horizontal oscillations. The liquid to be treated is introduced into the annular gap, primarily from above, and the concentrated liquid is removed at the bottom. The cleaned liquid is discharged between the screen and the wall of the housing. The feature of the invention is that the vibrator is mounted on at least three rubber elements which primarily allow the vibrator to perform a circular horizontal movement. However, by allowing the vibrator to move away vertically, these rubber elements also compensate for occurring vertical forces caused by unsymmetrical loads on the screen.

8 Claims, 4 Drawing Sheets

PRESSURE FILTER WITH VIBRATOR

FIELD OF APPLICATION

The field of application of the invention relates to the classifying or concentrating of liquids laden with fibres or solids by means of screening or filtration.

The reprocessing and recirculation of production waste water and sewage from different origin and industry branches, aiming to an economic use of water, is gaining more and more relevance. In particular in the paper industry, liquids laden with fibres or solids are produced during recycling of used paper, which liquids have to be classified and further concentrated.

When separating solids from the effluents of biogas plants and during a solid-liquid-separation of slurry, the filter can be used to discharge mucilage from the screened liquid, such that the concentrated flow can be transformed into a solid phase and a liquid phase more easily by using screw compressors.

CHARACTERIZATION OF THE KNOWN TECHNICAL SOLUTIONS

In the paper industry, pressure filters and pressure screens have prevailed, in which the liquid to be treated is subjected to a continuously changing, i.e. oscillating, positive or negative-pressure by a rotor in a housing. The liquid is pressed through the vertically disposed perforated screen or bar screen. Examples for such assemblies are shown in patent documents DE 2757746 and DE 199 11 884 A1.

In the German patent application 199 39 338.9, a vibration fine screen is proposed, which also comprises a vertical cylindrical screen in a housing, and a cylindrical vibrator having a horizontal maneuverability is arranged within the screen in place of the rotor. Also in this case, the solid particles are oscillatingly and vertically attached and lifted toward the screen in the rhythm of the oscillation of the vibrator. In the annular gap between the screen and the vibrator, negative and positive pressures alternate continuously. Due to the circular changing of the width of the annular gap, the liquid is additionally transferred into a motion slowly rotating in the annular gap. The vertical perforated screen or bar screen comprises openings having a size between 40 and 250 μm.

In this embodiment, the vibrator is suspending from bar-shaped spring members such that the rotary axis of the vibrator is always in a vertical position.

In the PCT application WO 02/26348 A1, the mentioned apparatus was further developed into a closed device, wherein the vibrator is retained by four dual Cardan joints about the center axis in a parallel alignment with respect to the screen.

In addition, a wiper is arranged between the vibrator and the screen for promoting the cleaning.

In the mentioned solutions, the exact guidance of the vibration unit on a horizontal circular path is emphasized.

In practice, however, it has proven that, when constructing such vibration fine screens, it is important to emphasize the mass distribution of the moved and unmoved components of the machine.

On the one hand, critical speeds occur upon acceleration of the imbalances, which speeds have to be passed as fast as possible. If this is not possible, the unit remains in a low speed range while experiencing shaking rotary motions, without reaching the desired operating speed.

On the other hand, the vibrator is submerged only partially into the liquid upon filling the fine screen and upon operation below the performance limit. The mass forces generated by the vibrator therefore act non-symmetrically onto the components of the machine and overcharge the bar or Cardan type joints between the housing and the vibrator.

Also during the continuous operation of the fine screen, a further disturbance of the symmetric application of forces occurs. Behind the screen, there is a free space for discharging the separated liquid.

The negative pressure generated with each revolution of the imbalances draws the liquid to be filtered away from the screen into the discharging chamber. Consequently, portions of air are drawn in the opposite direction of flow into the discharging chamber. These blend as small air bubbles with the liquid to be screened and move upwards. Concerning the vibration process, this means that the specific weight of the liquid decreases upwards.

In addition, the force transmission upon establishment of the negative and positive pressures between the vibration unit and the screen changes due to the compressibility of the thus encased air. Therewith, not only less mass is provided in these areas. Also the liquid laden with air is now compressible and interferes with the symmetric application of force.

In case of large fine screens, the vibrator, when filled, additionally features an uplift which is compensated by oppositely acting rubber buffers.

In the solutions known up to now, it was assumed that the oscillations of the vibrator act continuously and horizontally onto the screen surface and that no vertical forces are transmitted from the movable components, from which the vibrator is suspending or on which it is supported, into the housing.

In practice, however, the forces caused by the described non-symmetric effects have to be absorbed by the guiding members being movable only horizontally.

In case of a speed of the imbalances of the vibrator of 3000 rpm, this means that more than a billion of alternating oscillations per year have to be absorbed by these components.

Since centrifugal forces of 0.5 to 1 t are applied in case of a fine screen having a screen surface of 2 m$^2$, this effect not only results in a faster destruction of the corresponding components, but also in an unsteady and variable operating behaviour of the fine screen and in secondary oscillations at other components, which are hardly to control.

OBJECT OF THE INVENTION

It is an object of the invention to change the suspension of the cylindrical vibrator vis-à-vis the known solutions such that, on the one hand, a sufficient mobility for the primarily circular horizontal motion of the vibrator is guaranteed.

On the other hand, the suspension of the cylindrical vibrator has to be configured such that the forces caused by non-symmetric loads on the system can be compensated by a vertical movement of the vibrator.

FEATURES OF THE INVENTION

It was found out that only a small vertical travel is required for absorbing the lateral forces generated by the non-symmetric loads on the system through the oscillation behaviour of the masses at hand. The dimension thereof lies below or at a maximum in a millimeter range.

Since, according to the above explanations, the mass forces are effective in particular in the lower portion, the connection of the vibration unit to the housing is also realized in the lower portion of the machine. In the described examples of the state of the art, vertically rigid machine components were used, such as spoke-shaped spring bars or dual Cardan joints.

According to the invention, cylindrical rubber buffers are used for small fine screens without uplift, which buffers have a large horizontal mobility, but are also able to move away vertically to a certain extent. In case of large fine screens having an uplift of the vibrator, rubber-buffered Cardan-type members are used, which may also move upwards or downwards in addition to a vertical mobility.

It is further provided that the liquid to be cleaned flows into the housing tangentially in accordance with the rotary direction of the vibration unit. In this way, the liquid to be separated is conveyed through the fine screen on a spiral path through the annular gap between vibrator and screen. The concentrated sludge is discharged in the lower portion also in accordance with the rotary rotation of the vibration unit, or also centered at the bottom of the housing.

EMBODIMENT

In the following, the invention is explained in more detail with reference to FIGS. 1 to 4.

For a better overview, FIG. 1 only shows the perspective illustration of the complete fine screen.

Figure 4:
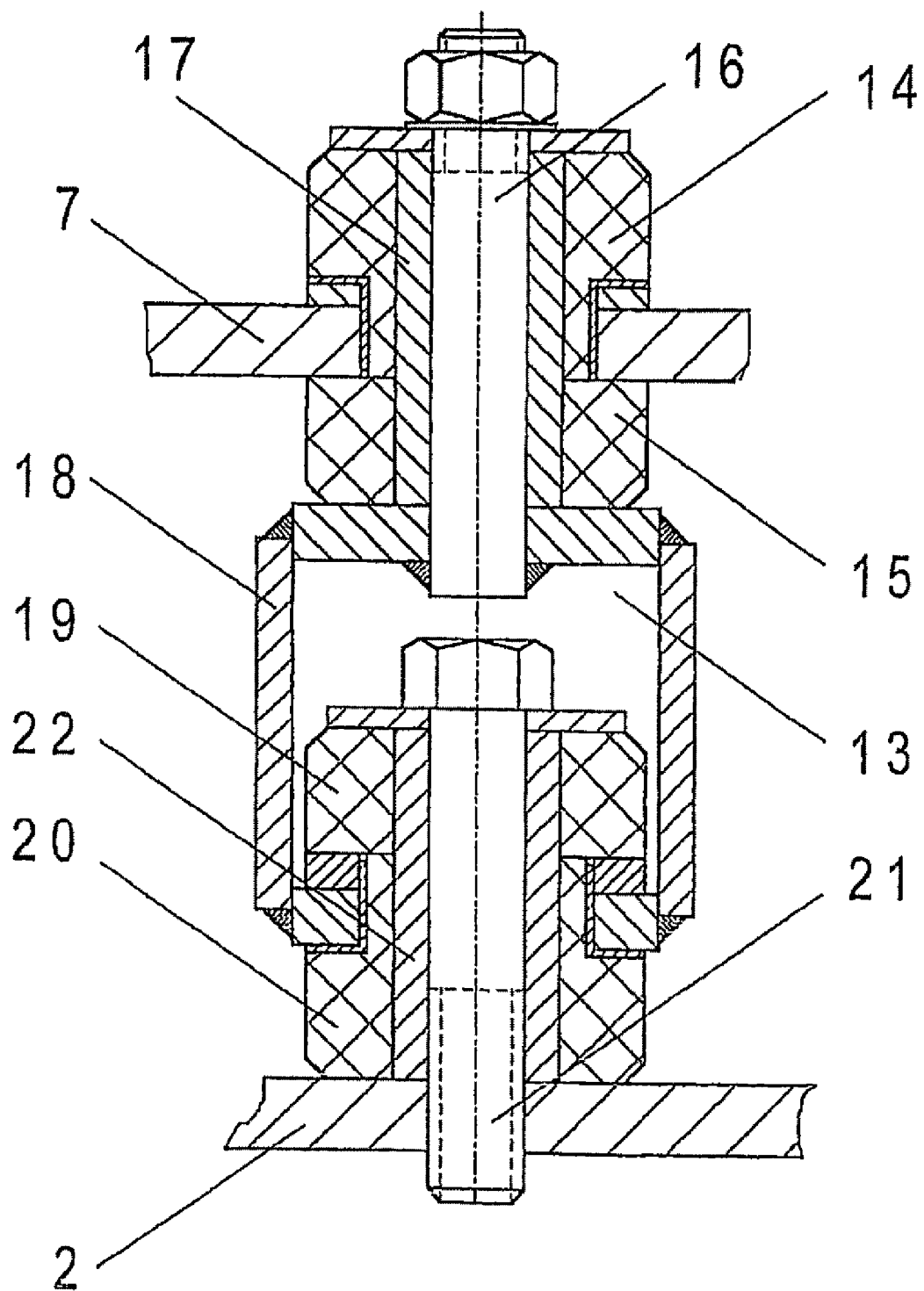

In FIG. 4, a rubber-buffered Cardan-type connection member is shown.

Figure 1:
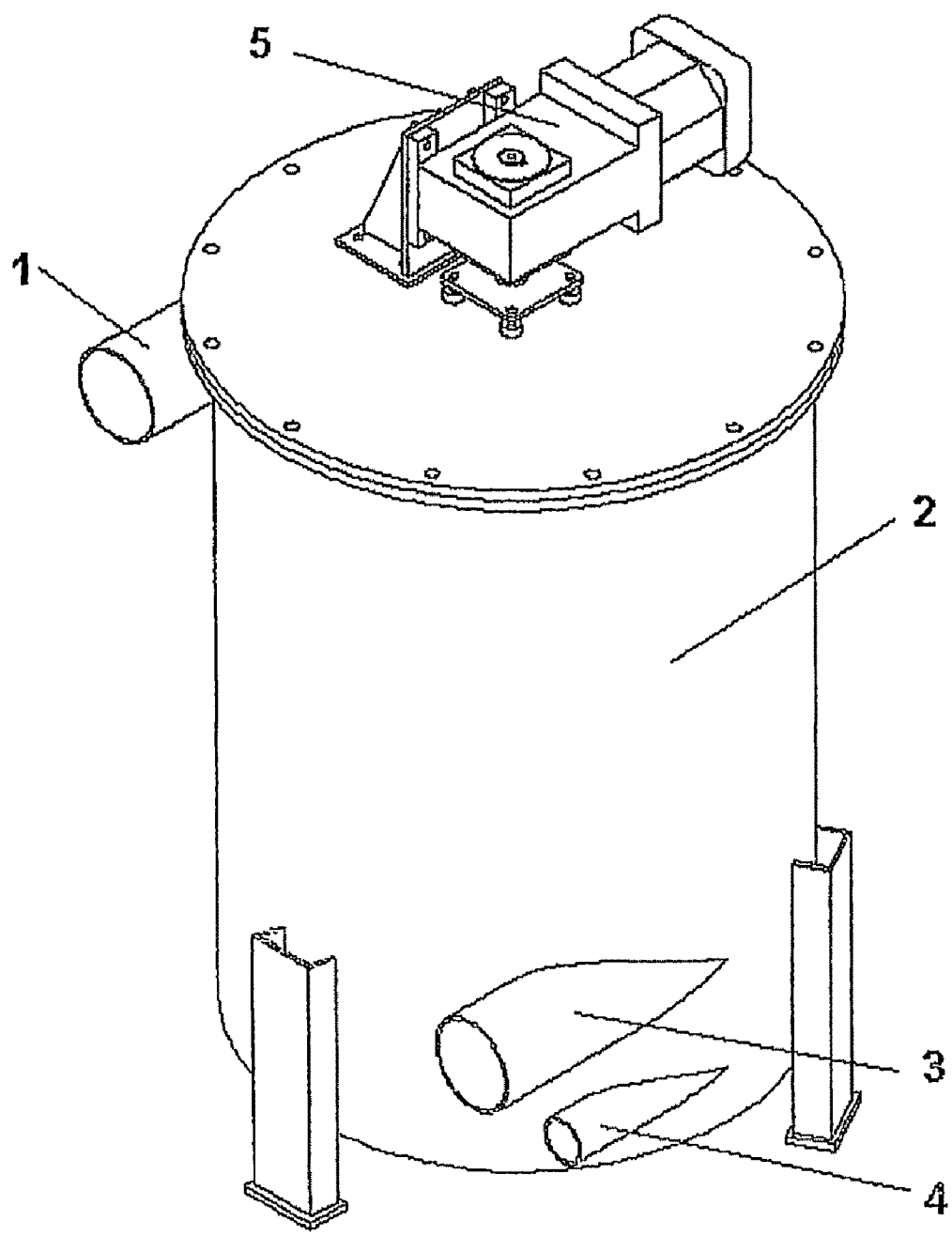

In FIG. 1, the liquid to be cleaned is introduced into the machine through a pipe socket (1) tangentially and in the same rotary direction as the vibration unit. The fine screen and the vibration unit are arranged within the housing (2). The cleaned liquid is discharged from the fine screen through the pipe socket (3). The concentrated sludge is continuously drawn off through the pipe socket (4) tangentially and in the same direction of flow.

For promoting the screening procedure, a wiper can be arranged in the annular gap between the vibrator and the screen, which wiper is driven through the motor control gear (5).

Figure 2:
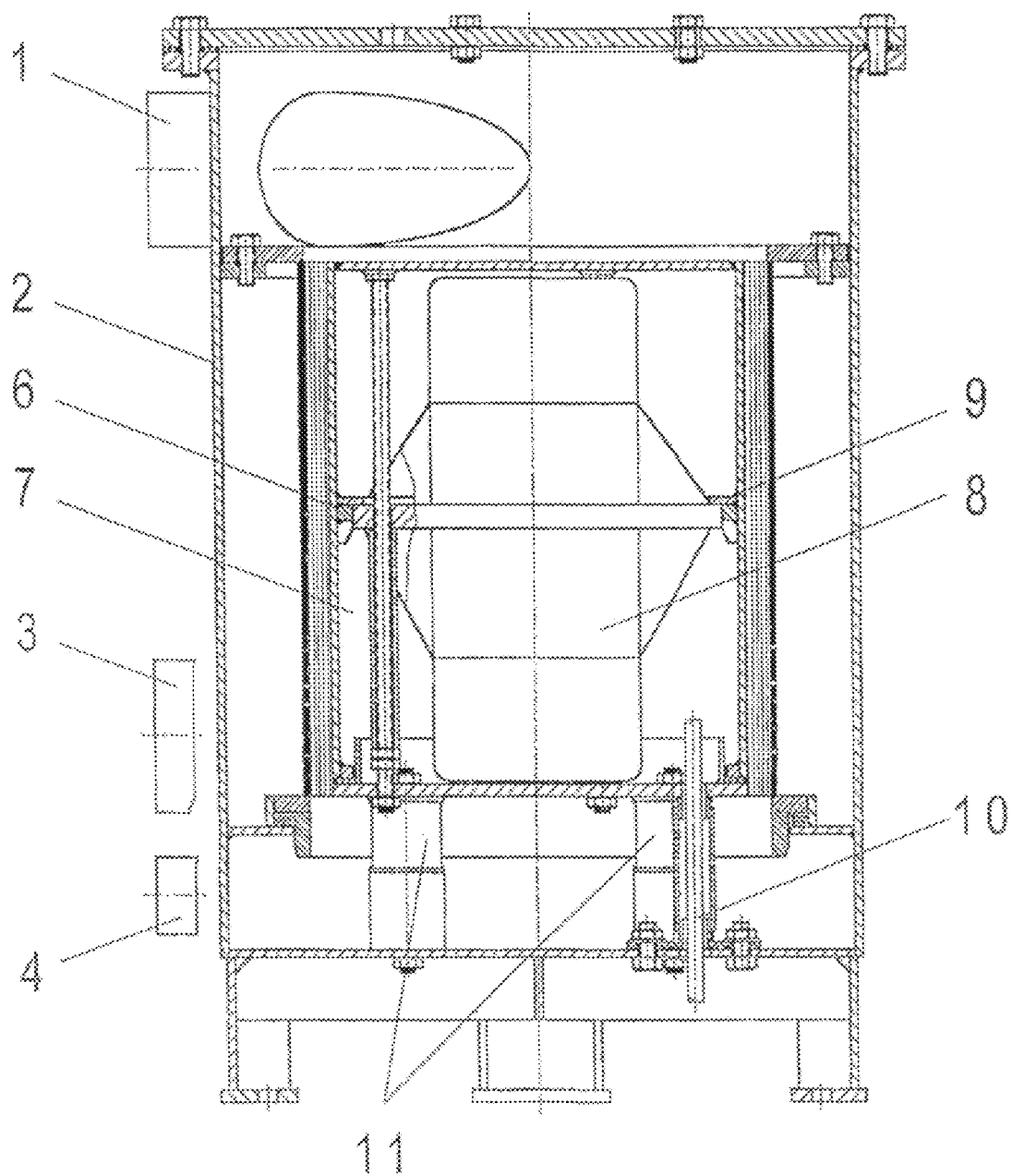
FIG. 2 shows a sectional view of a small fine screen which does not yet comprise a wiper between the screen and the vibrator.

FIG. 2 shows a sectional view of a small fine screen, the vibrator of which is heavier than the displaced amount of liquid and in which no wiper is arranged between the vibrator and the screw.

As shown in FIG. 1, the pipe socket (1) for introducing the liquid to be cleaned and the pipe socket (3) for discharging the cleaned liquid are also discernible in this case. The concentrated liquid is discharged from the machine through the pipe socket (4).

In the housing (2), the cylindrical bar screen (6) having a screen surface of 0.75 m$^2$ is arranged. The screen has a height of 350 mm and a diameter of 300 mm. The cylindrical vibration unit (7) has a diameter of 270 mm, such that an annular gap of 15 mm is obtained.

The vibration motor (8) is attached to a flange (9) of the vibration unit (7) and is supplied with current through a flexible cable channel (10).

The inventive object of providing a suspension of the vibration unit being movable in horizontal and vertical direction is fulfilled by three rubber buffers (11) arranged on a pitch circle of 200 mm and with a distance of 120°.

Figure 3:
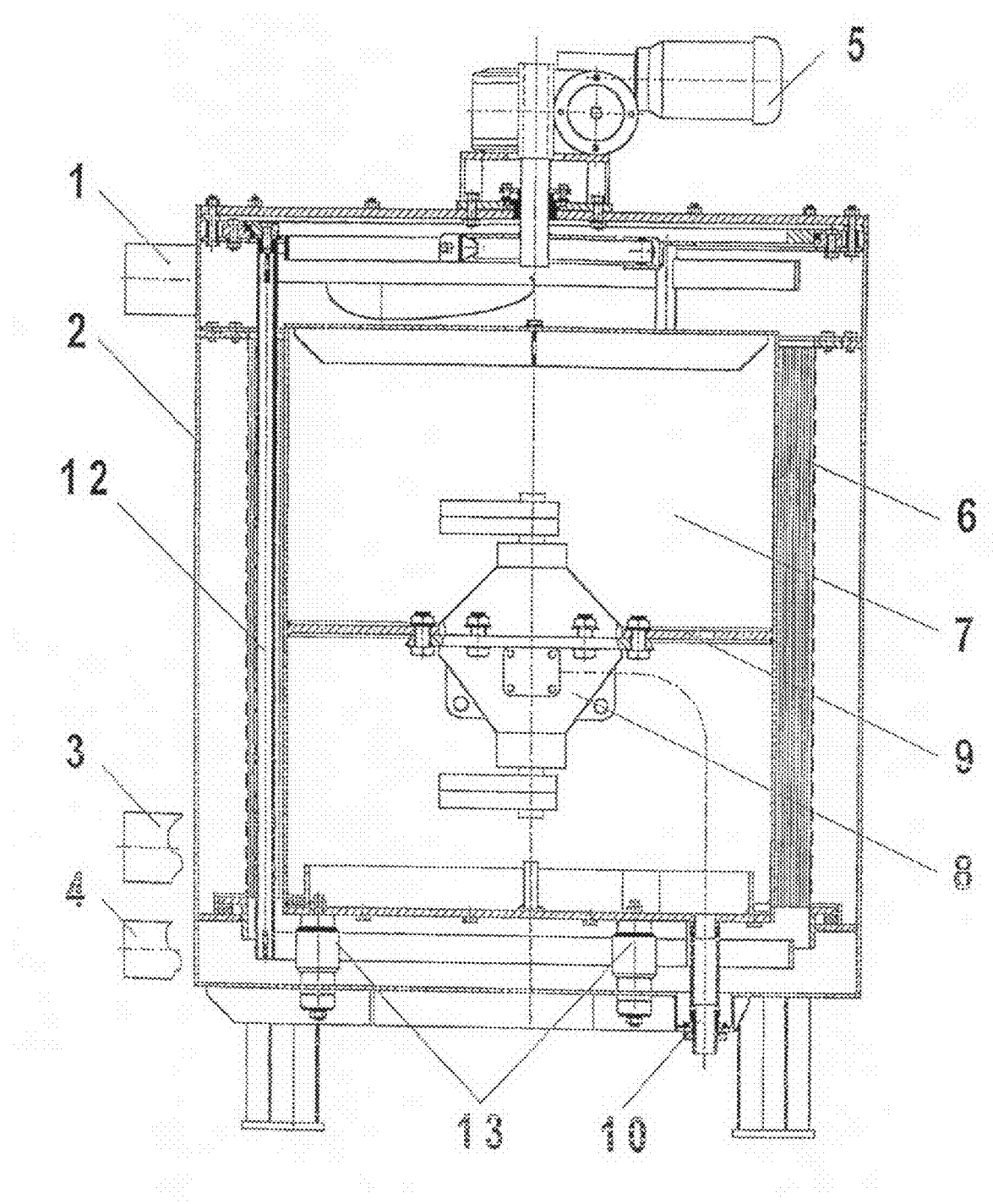
FIG. 3 shows a fine screen, the vibrator of which floats upon filling and comprises a wiper between the screen and the vibrator.

FIG. 3 shows a sectional view of the fine screen. Members not described in the following correspond to the members of FIGS. 1 and 2. In this fine screen, the vibrator (7) generates an uplift due to its size. For promoting the cleaning of the screen, a wiper (12) is arranged between the vibrator (7) and the bar screen (6), which wiper is driven by the motor control gear (5).

In the housing (2), the cylindrical split screen (6) having a screen surface of 2 m$^2$ is arranged. The height and the diameter of the screen are 800 mm. The cylindrical vibration unit (7), also 800 mm high, has a diameter of 700 mm.

Therewith, the wiper (12) moves on a circular path between the vibration unit (7) and the split screen (6) in an annular gap being 50 mm wide.

The inventive object of providing a suspension of the vibration unit (7) being movable in horizontal and vertical direction is fulfilled by three rubber-buffered Cardan-type members (13) which are explained in more detail in FIG. 4.

FIG. 4 shows a sectional view of a rubber-buffered Cardan-type member (13) for connecting the vibrator (7) to the housing (2).

The vibrator (7) is clamped between an upper rubber buffer (14) and a lower rubber buffer (15) by means of the screw (16) and the distance sleeve (17). An intermediate body (18) is arranged at the screw (16), in which an upper rubber buffer (19) and a lower rubber buffer (20) establish the Cardan-type connection between the housing (2) and the vibrator (7) by means of the screw (21) and another distance sleeve (22).

In addition to the horizontal mobility, forces directed upwards as well as downwards can thus be absorbed.

The invention claimed is:

1. An apparatus for classifying or concentrating a liquid laden with fibers or solids by means of screening or filtration by using a cylindrical fine screen having hole-shaped or slot-shaped openings, said screen being fixedly clamped in a housing in a vertical position, in the interior of which an axially cylindrical vibrator is arranged, in a manner forming an annular gap, in which a vibration motor is disposed, which performs circular horizontal oscillations, and in which the liquid to be treated is introduced at one side of the annular gap and the classified or concentrated liquid is removed from the opposite side and the cleaned liquid or the liquid provided with fine particles is discharged between the screen and the housing wall, characterized in that the vibration unit is connected to the housing such that a vertical mobility is enabled in addition to the horizontal mobility, wherein the horizontal and vertical mobility of the vibration unit is assumed by at least three rubber buffers.

2. The apparatus of claim 1, wherein at least one of the three rubber buffers comprises a rubber-buffered Cardan-type member.

3. The apparatus of claim 2, wherein the rubber buffered Cardan-type member comprises:
   first upper and lower rubber buffers;
   second upper and lower rubber buffers;
   first and second screws; and,
   first and second distance sleeves, wherein
   the vibrator is clamped between the first upper rubber buffer and the first lower rubber buffer by means of the first screw, the first distance sleeve and an intermediate body being arranged at the first screw, and wherein
   the second upper rubber buffer and the second lower rubber buffer establish a Cardan-type connection between the vibrator and the housing by means of the second screw and the second distance sleeve.

4. The apparatus of claim 2, comprising a wiper disposed in the annular gap between the vibrator and the screen and is configured for movement therein.

5. The apparatus of claim 1, wherein the liquid to be cleaned flows into the housing tangentially in a same direction as the rotary direction of the vibration unit and the concentrated sludge is drawn off from the fine screen in the same direction of flow.

6. The apparatus of claim 1, wherein the at least three rubber buffers comprise Cardan-type members.

7. The apparatus of claim 6, wherein the at least 3 Cardan-type members each comprise:
   first upper and lower rubber buffers;
   second upper and lower rubber buffers;
   first and second screws; and,
   first and second distance sleeves, wherein
   the vibrator is clamped between the first upper rubber buffer and the first lower rubber buffer by means of the first screw, the first distance sleeve and an intermediate body being arranged at the first screw, and wherein
   the second upper rubber buffer and the second lower rubber buffer establish a Cardan-type connection between the vibrator and the housing by means of the second screw and the second distance sleeve.

8. The apparatus of claim 1, comprising a wiper disposed in the annular gap between the vibrator and the screen and is configured for movement therein.

* * * * *